United States Patent [19]
Stenstrom

[11] Patent Number: 6,161,444
[45] Date of Patent: Dec. 19, 2000

[54] PRECISION LINEAR ADJUSTMENT MECHANISM

[75] Inventor: Jeffrey J. Stenstrom, Long Beach, Calif.

[73] Assignee: Raytheon Company, Lexington, Mass.

[21] Appl. No.: 09/322,740

[22] Filed: May 28, 1999

[51] Int. Cl.[7] .................................................. F16H 27/02
[52] U.S. Cl. ........................ 74/89.15; 74/107; 74/10.41; 74/110; 74/527
[58] Field of Search .................... 74/89.15, 107, 74/110, 527, 10.41

[56] References Cited

U.S. PATENT DOCUMENTS

| | | | |
|---|---|---|---|
| 4,858,481 | 8/1989 | Abraham | 74/89.15 |
| 6,101,889 | 8/2000 | Laskey | 74/89.15 |

*Primary Examiner*—Lenard A. Footland
*Attorney, Agent, or Firm*—Colin M. Raufer; Glenn H. Lenzen, Jr.

[57] ABSTRACT

A compact adjustment mechanism that provides precision linear travel. The drive mechanism has a knob with a paddle at an inner end that is used to transfer torque. A drive screw has a plurality of grooves disposed around an outer diameter, a plurality of threads at an opposite end from the plurality of grooves, and a torque transfer leaf spring that receives the paddle. A drive housing has a bored hole into which the drive screw is disposed. A threaded hole is formed at an end of the bored hole distal from the knob that receives the plurality of threads of the drive screw. A ball spring plunger is disposed in a threaded hole on the side of the drive housing that mates with the plurality of grooves in the drive screw. The drive screw may have different configurations to implement linear straight movement, provide 90 degree linear movement, or drive a pivot lever.

11 Claims, 3 Drawing Sheets

PRECISION LINEAR ADJUSTMENT MECHANISM

BACKGROUND

The present invention relates generally to drive mechanisms, and more particularly, to a linear adjustment mechanism for use in translating optical elements, and the like.

Conventional linear drive and adjustment mechanisms known to the present inventor are typically large with about 7–9 parts. Conventional linear drive mechanisms typically have shafts, collars, clutches, torque knobs, and linkages. The conventional mechanisms are too large and heavy for use as hand held devices.

It would therefore be desirable to have a linear adjustment mechanism for use in translating optical elements, and the like, that requires fewer components and is lighter than conventional devices designed for similar use.

SUMMARY OF THE INVENTION

The present invention provides for a compact adjustment mechanism that provides precision linear travel. The drive mechanism comprises a knob 11 having a paddle 26 at one end that is used to transfer torque. A drive screw 13 has a plurality of grooves 32 disposed around an outer diameter, a plurality of threads 31 at an opposite end, and a torque transfer leaf spring 12 for receiving the paddle. A drive housing 14 has a bored hole 41 into which the drive screw is disposed. A threaded hole 42 is formed at an end of the bored hole distal from the knob that receives the plurality of threads of the drive screw. A ball spring plunger 15 is disposed in a threaded hole 43 on the side of the drive housing that mates with the plurality of grooves in the drive screw.

The drive mechanism may be used to translate optical elements to provide for boresighting or focus. The drive mechanism provides very fine linear travel with a detent and over-torque spring protection feature. The knob may be mounted on a cover with or without the use of an O-ring seal. The drive mechanism is compact and light weight and contains only 5 parts. The total dimensions of a reduced to practice embodiment of the linear drive mechanism is only 0.70×0.70×1.25 inches.

The drive mechanism uses very few parts that provide multiple functions. The drive mechanism can be used to transfer linear movement through the cover without linkages, collars and shafts. Most similar mechanisms are large and have torque knobs connected to a shaft, collars connected to a detent wheel, drive screw and holding plate. These conventional mechanisms are heavy and are difficult to seal. The conventional drive mechanisms have a linkage to allow the fine pitched screw to translate without moving the knob in and out. The present drive mechanism combines all the features without adding linkages and extra parts.

The present drive mechanism has few parts and is specially designed to transfer rotary knob travel into precision linear travel. A spring ball plunger and V-grooves provide a locking feature. A leaf spring provides over torque protection. The alignment of the cover and the mechanism is not critical because torque is transmitted by way of the leaf spring. This allows the cover to move as a result of vibration, but this movement will not rotate the drive screw. Alignment of the cover is not critical because the spring adjusts to any misalignment. The cover may be installed by sliding the knob paddle into the leaf spring. No linkages or shafts need to be connected as in conventional drive mechanisms.

The drive mechanism may readily be used as a component in laser rangefinders, for example. One such laser rangefinder developed by the assignee of the present invention has a laser mounted on a handheld military weapon. The drive mechanism is used to translate the telescope objective lens in azimuth and elevation to boresight the laser beam to the weapon barrel. The drive mechanism may also be used to translate reticles or focus optical elements inside optical devices. The drive mechanism may also be used in situations where precision linear adjustment is needed.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which.

DETAILED DESCRIPTION

Figure 1:
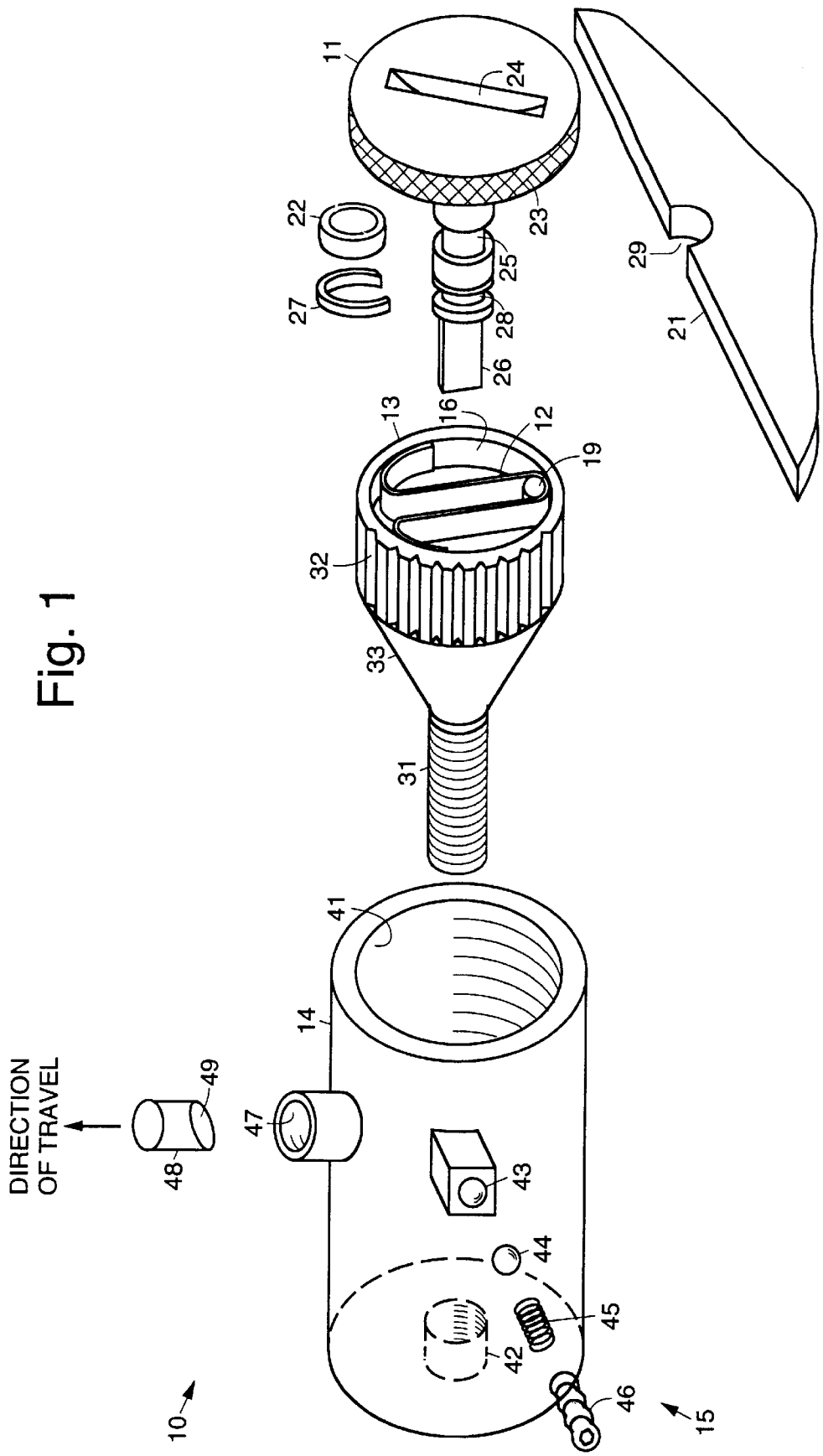
FIG. 1 is an exploded view that illustrates an exemplary embodiment of a linear adjustment mechanism in accordance with the principles of the present invention.
Figure 2:
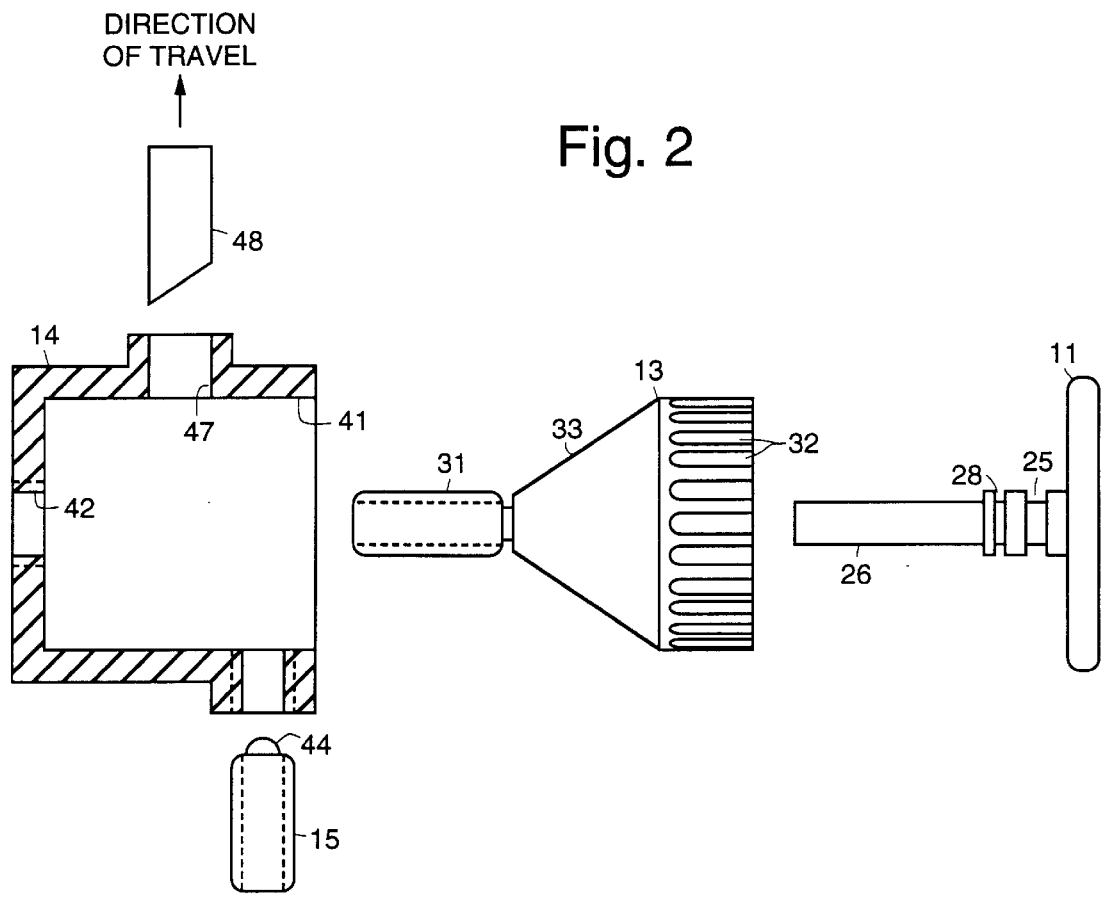
FIG. 2 is an exploded partial cross sectional side view of the linear adjustment mechanism of FIG. 1.

Referring to the drawing figures, FIG. 1 is an exploded view of an exemplary embodiment of a linear adjustment mechanism 10 in accordance with the principles of the present invention. FIG. 2 is an exploded partial cross sectional side view of the linear adjustment mechanism 10 shown in FIG. 1, which is a 90 degree drive mechanism 10. The linear adjustment mechanism 10 has five major components including a knob 1, a torque transfer leaf spring 12, a drive screw 13, a drive housing 14, and a ball spring plunger 15.

The knob 11 is typically mounted to a cover 21 or housing 21 with or without an O-ring seal 22. The outer surface of the knob 11 may be textured 23 or may include an opening 24 that receives a screwdriver or coin (not show) for turning the knob 11. A center section of the knob 11 may have a groove 25 for receiving the O-ring seal 22. An inner end of the knob 11 has a rectangular paddle 26 to transfer torque. A retaining clip 27 and retaining clip groove 28 formed in the center section of the knob 11 may be used to secure the knob 11 in an opening 29 in the housing 21 or cover 21.

The drive screw 13 has fine pitched threads 31 (about 80 threads per inch, for example) on one end and multiple V-grooves 32 (12–16, for example) around its outer diameter. The torque spring 12 is mounted within an opening 16 in the drive screw 13 and is wrapped around a pin 19. A center section of the drive screw 13 may have different configurations implement linear straight movement (FIG. 2), provide 90 degree linear movement (FIGS. 1, 3 and 5), or drive a pivot lever 51 (FIG. 4). As is shown in FIGS. 1 and 2, the drive screw 13 has a tapered surface 33 whose taper matches that of a tapered surface 49 of a moveable sliding mechanism 48.

The drive housing 14 has a bored hole 41 with a fine pitched threaded hole 42 or insert 42 at the bottom. The bored hole 41 provides a slip fit for the drive screw 13 which provides a bearing as it rotates. A threaded hole 43 on the side of the drive housing 14 mounts the ball spring plunger 15 to provide a detented locking feature. The ball spring plunger 15 includes a ball 44, a spring 45 and a screw 46.

The drive housing 14 has an opening 47 through its top surface into which the moveable sliding mechanism 48 is disposed. The tapered surface 49 of the moveable sliding mechanism 48 mates with the tapered surface 33 of the drive screw 13 and is moved upward and downward (in FIGS. 1 and 2) when the drive screw 13 moves into and out of the drive housing 14.

Figure 3:
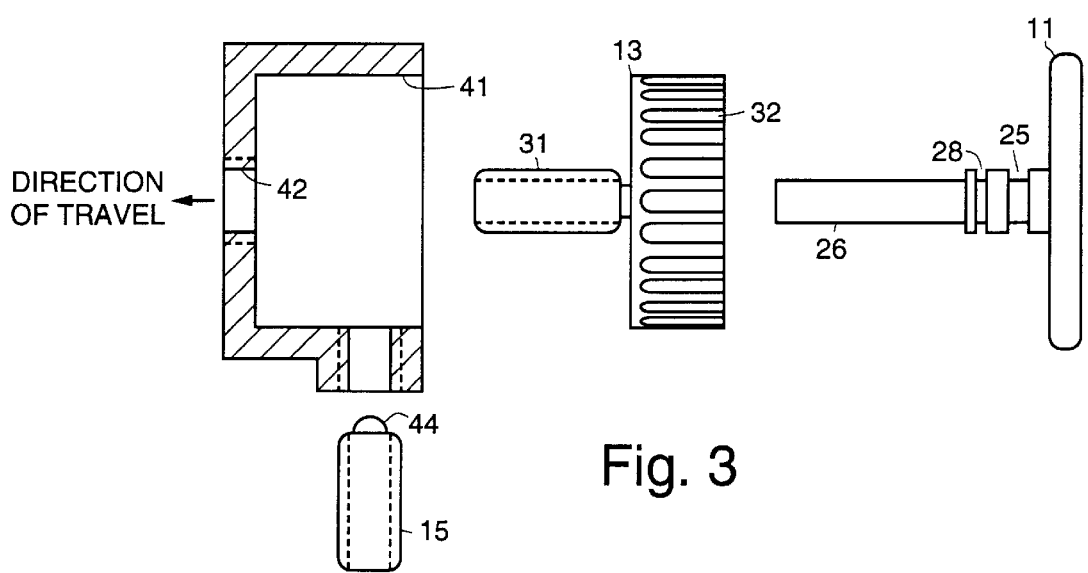
FIG. 3 is an exploded partial cross sectional side view of a second embodiment of the linear adjustment mechanism.
Figure 4:
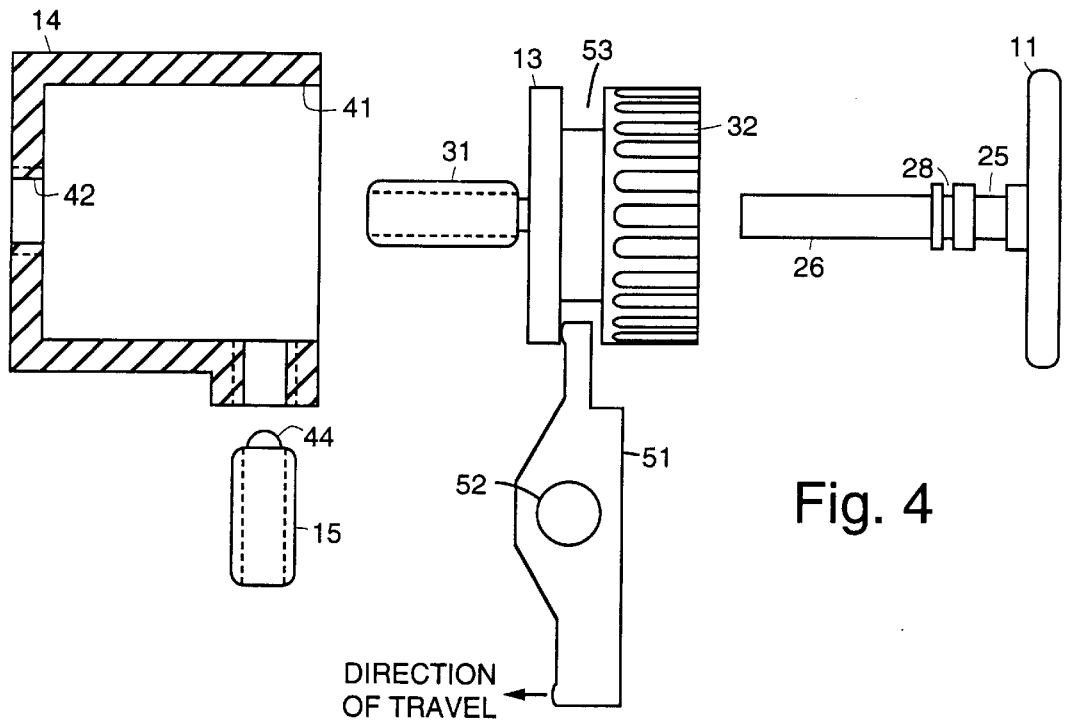
FIG. 4 is an exploded partial cross sectional side view of a third embodiment of the linear adjustment mechanism.

FIG. 3 is an exploded partial cross sectional side view of a second and basic embodiment of the linear adjustment mechanism 10. This embodiment of the linear adjustment mechanism 10 is used to provide linear drive force. In the second embodiment of the linear adjustment mechanism 10, the center section of the drive screw 13 is straight. The drive screw 13 includes only the fine pitched threads 31 on one end and multiple V-grooves 32 around its outer diameter.

FIG. 4 is an exploded partial cross sectional side view of a third embodiment of the linear adjustment mechanism 10, which comprises a pivoting drive mechanism 10. The drive screw has the fine pitched threads 31 on one end and multiple V-grooves 32 around its outer diameter. In the third embodiment of the linear adjustment mechanism 10, the center section of the drive screw 13 is straight but also has a relatively large pivot lever groove 53 that receives the pivot lever 51. The pivot lever 51 pivots about a transverse pin 52 to change the direction of travel of its outermost tip.

Figure 5:
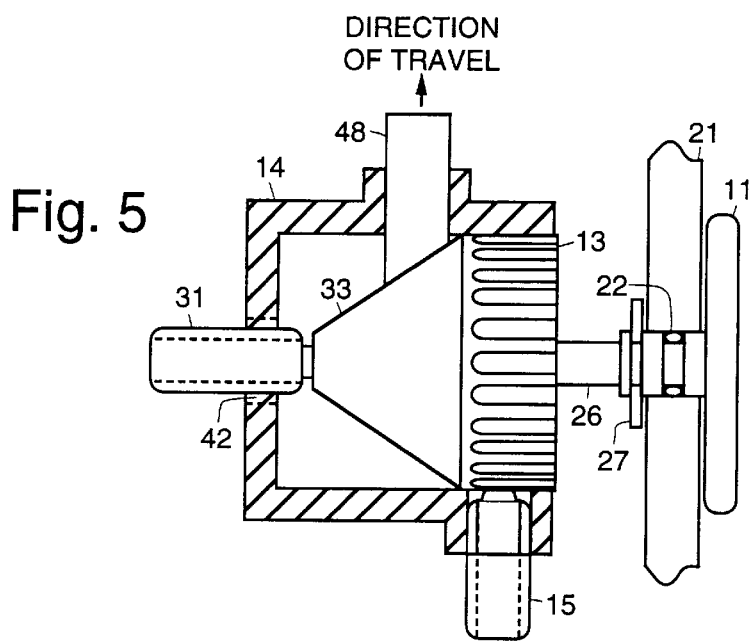
FIG. 5 is a partial cross sectional side view of a fully assembled linear adjustment mechanism.
Figure 6:
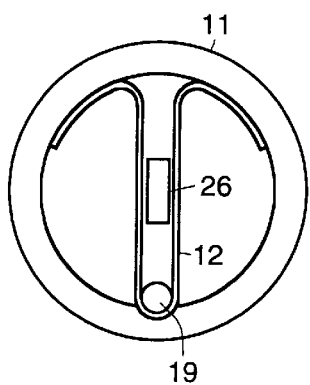
FIG. 6 shows an end view of the linear adjustment mechanism of FIG. 5.

FIG. 5 is a partial cross sectional side view of a fully assembled linear adjustment mechanism shown in FIGS. 1 and 2, while FIG. 6 shows an end view of the linear adjustment mechanism 10 shown in FIG. 5. The leaf spring 12 is installed into the drive screw 13 as is shown in FIG. 5. The knob paddle 26 is inserted into a center section of the leaf-spring 12. As the knob 11 rotates, the spring force prevents the spring 12 from deflecting too much so that torque is transferred to the drive screw 13. At the end of the adjustment, the screw 13 stops and the spring 12 deflects to allow the paddle 26 to rotate.

This feature provides for over-torque protection so no damage occurs due to the application of too much torque. The drive screw 13 moves in and out during rotation. The spring 12 and paddle 26 slides during rotation but still transfers torque. The bored hole 41 of the drive housing 14 and the outer diameter of the drive screw 13 provide a load bearing interface so no binding occurs. The V-grooves 32 on the outer diameter of the drive screw 13 provide the locking feature. The spring loaded ball bearing plunger 15 mounted in the drive housing 14 pushes the ball 44 into one of the V-grooves 32 and provides a spring loaded lock. The V-grooves 32 are long because the drive screw 13 moves in and out and the plunger 15 is fixed.

The linear drive mechanism 10 uses the drive screw 13 to control movement of the driven mechanism (not shown) when the knob 11 is rotated. In the first embodiment of the linear drive mechanism 10 shown in FIGS. 1, 2 and 5, movement of the drive screw 13 moves the sliding mechanism 48 upward and downward to move the driven mechanism. In the embodiment of the linear drive mechanism 10 shown in FIG. 3, movement of the drive screw 13 linearly moves the driven mechanism along the axis of the drive screw 13. In the embodiment of the linear drive mechanism 10 shown in FIG. 4, movement of the drive screw 13 pivots the pivot lever 51 about the transverse pin 52 as it moves in an out of the bored hole 41 in the drive housing 14.

In the first embodiment of the linear drive mechanism 10 shown in FIGS. 1, 2 and 5, the tapered center section of the drive screw 13 provides a wedge to push the sliding mechanism 48 (rod) at a 90 degree angle relative to the axis of the drive screw 13. The angle of the tapered section of the drive screw 13 may be changed to make the travel have more or less resolution.

In the embodiment of the linear drive mechanism 10 shown in FIG. 4, the drive screw 13 has a straight cut section that forms the pivot lever groove 53 that drive the pivot arm 51. The drive screw pushes the pivot arm 51 to provide linear or rotational travel. The various embodiments of the drive mechanism 10 may be used to rotate a boresight mirror or prism, for example.

The driven mechanism that is moved by the linear drive mechanism 10 may be a simple linear sliding component with a spring return feature or a linear bearing with spring return feature. The drive screw 13 drives the sliding component against the spring and the spring pushes the sliding component in the opposite direction. One application of this type of drive mechanism 10 is to translate an objective lens in two axes using two separate drive mechanisms 10, one for the x-axis and one for the y-axis. Moving the objective lens steers the line of sight of a telescope comprising the objective lens.

In laser applications, for example, a laser beam may be steered to align the laser to a weapon barrel, for example. The drive mechanism 10 may also be used to translate a reticle by moving a cross hair in the field of view. An optical element may be focused by moving it along an optical axis with a single drive mechanism 10. The linear resolution of a reduced to practice embodiment of the drive mechanism 10 is about 0.00078 inches per detent for an 80 thread per inch thread and 16 detents per rotation. The reduced to practice embodiment of the drive mechanism 10 is well suited for use in optical positioning and translation applications.

Thus, a linear adjustment mechanism for use in translating optical elements, and the like has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A linear adjustment mechanism, comprising:
   a knob comprising a paddle at one end for transferring torque;
   a drive screw comprising a plurality of grooves around an outer diameter, a plurality of threads at an end opposite from the plurality of grooves, and a torque transfer leaf spring for receiving the paddle;
   a drive housing having a bored hole formed therein for receiving the drive screw, having a threaded hole at an end of the bored hole distal from the knob for receiving the plurality of threads of the drive screw, and a ball spring plunger disposed in a threaded hole on the side of the drive housing that mates with the plurality of grooves in the drive screw.

2. The mechanism recited in claim 1 wherein the knob is mounted to a housing.

3. The mechanism recited in claim 1 the knob further comprises an O-ring seal.

4. The mechanism recited in claim 3 wherein the knob comprises an opening for turning the knob.

5. The mechanism recited in claim 3 wherein the knob has a groove for receiving an O-ring seal.

6. The mechanism recited in claim 3 further comprising a retaining clip to secure the knob in an opening in the housing.

7. The mechanism recited in claim 1 wherein the bored hole provides a slip fit for the drive screw to provide a bearing therefor.

8. The mechanism recited in claim 1 wherein the ball spring plunger comprises a ball, a spring and a screw.

9. The mechanism recited in claim 1 wherein the drive housing has an opening through a selected surface and into which a moveable sliding mechanism having a tapered surface is disposed, and wherein the drive screw has a tapered surface whose taper matches that of the tapered surface of the moveable sliding mechanism so that movement of the drive screw moves the moveable sliding mechanism transverse to the direction of motion of the drive screw.

10. The mechanism recited in claim 1 wherein the drive screw has a pivot lever groove that receives a pivotable lever that pivots to change the direction of travel of its outermost tip.

11. The mechanism recited in claim 1 wherein the plurality of threads and threaded hole comprise fine pitched threads to provide for a corresponding amount of resolution.

\* \* \* \* \*